June 25, 1968 MASAHISA MIYAGI 3,390,335
FREQUENCY-DIVERSITY TRANSMITTER-RECEIVER
Filed Dec. 16, 1964
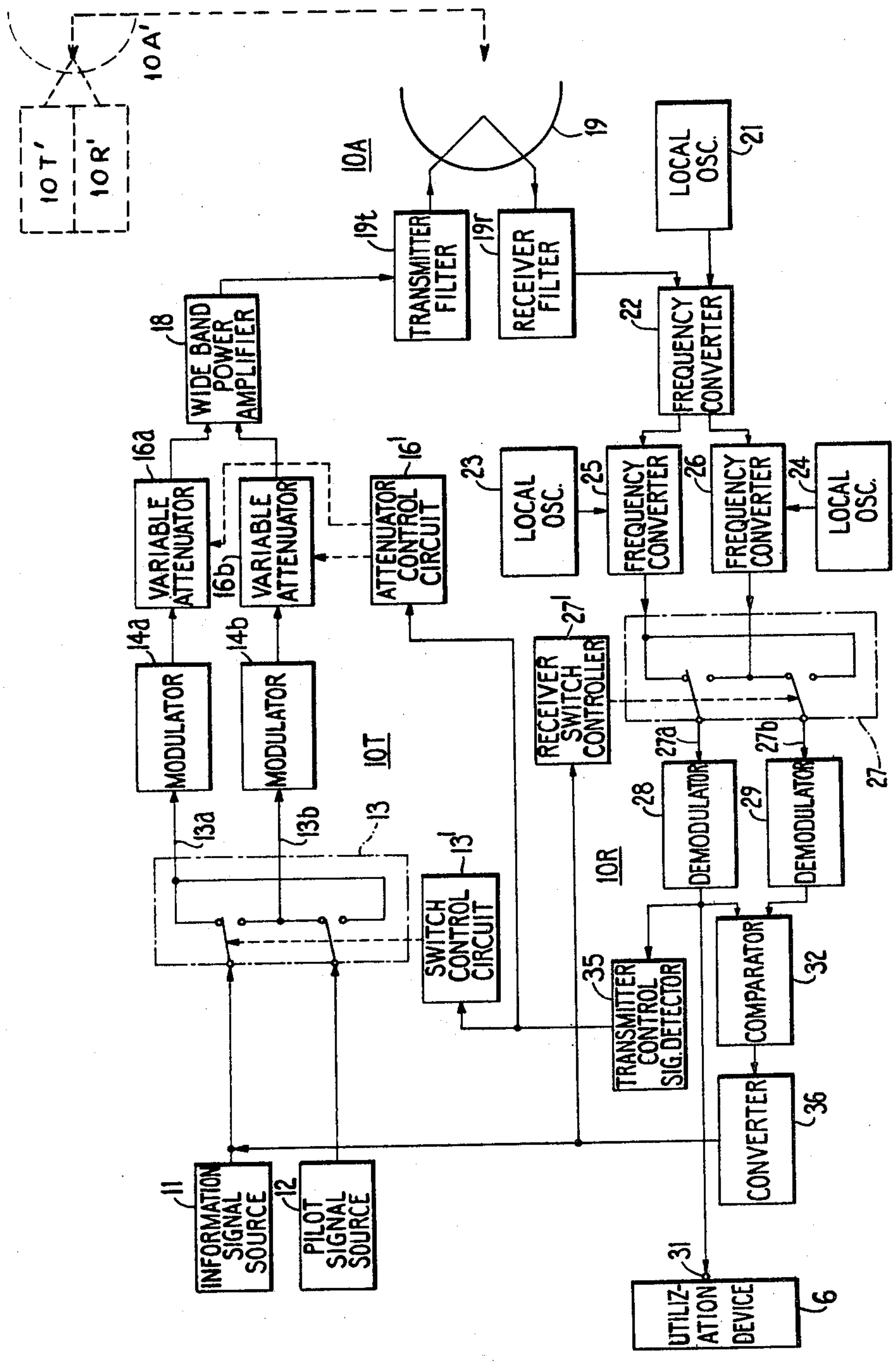
*Inventor*
M. MIYAGI
By [signature]
*Attorney*

United States Patent Office 3,390,335
Patented June 25, 1968

3,390,335
FREQUENCY-DIVERSITY TRANSMITTER-RECEIVER

Masahisa Miyagi, Tokyo, Japan, assignor to Nippon Electric Company, Limited, Tokyo, Japan, a corporation of Japan Filed Dec. 16, 1964, Ser. No. 418,672
Claims priority, application Japan, Dec. 31, 1963, 38/68,867
1 Claim. (Cl. 325—56)

ABSTRACT OF THE DISCLOSURE

This application teaches a frequency-diversity communication system wherein remote locations may reliably transmit to one another by means at each location comprised of a transmitter facility for transmitting an information signal train and a pilot signal train having a much reduced bandwidth relative to the information signal train. The two signal trains are each employed to modulate two carriers of different carrier frequencies. The modulated carriers are then combined in an amplifying and transmitting means for transmission to a remote location. Switching means are coupled between the information signals and the pilot signals for selectively reversing the connections between the modulating circuits and the two signal sources. Each receiver facility at each location is provided with means for receiving and frequency converting the pair of incoming modulated signals. After frequency conversion the signals are then demodulated and compared to determine which of the two has a lower noise level. As a result of this comparison the signal is generated to be applied together with the information signal source train and a second signal to be applied to a switch control circuit for switching the connection between the two signal trains in the transmitter portion and the two modulators so as to insure the fact that the information signal source is being transmitted by the modulator having the lower of the two noise levels. The pilot signal source being of much reduced bandwidth causes the overall bandwidth of the transmitted combined signals to be substantially reduced. Also, since the carrier frequency introducing the least amount of noise is employed to be modulated by the information signal pulses this same carrier is likewise modulated by the control signal to cause the remote location to receive the control signal in the modulated signal having the lowest noise level in order to make the appropriate switching as between its information and pilot signal sources and its pair of modulators.

This invention relates to a frequency-diversity transmitter-receiver. More particularly, it relates to, but not restricted to, a frequency-diversity transmitter-receiver for use in a microwave relay system.

In the simplest dual frequency diversity system a conventional transmitter-receiver includes: a frequency-diversity transmitter portion which is provided with a signal circuit which either divides the information signal to be transmitted into two or into two groups of frequency division multiplexed subcarrier waves modulated by the respective information signals in two. A pair of carrier-frequency power amplifiers are also provided in the transmitter each of which includes a frequency converter. These converters have different center frequencies and are adapted to produce, in response to the respective divided information signals or subcarrier wave groups supplied from the signal dividing circuit, the modulated carrier waves which are frequency-modulated by the respective information signals or by the respective subcarrier wave groups. The transmitter also has a branching filter for sending the modulated carrier waves to the antenna as electromagnetic waves having a given common plane of polarization. The system also includes a frequency-diversty receiver portion which has a receiver branching filter for sending the microwave input signal sent from the participant transmitter and received by the antenna to a subsequent stage. A pair of receiver demodulators are provided for demodulating the outputs having different frequencies which are received from the branching filter. A signal combining device is provided in the receiver for either combining or switching a pair of demodulated signals from the receiver demodulators in order to eliminate adverse effects, such as those caused by faults in the transmission path. The carrier-frequency power amplifiers provided in the transmitter portion are always set to operate so as to make the modulated frequency-diversity carrier waves be received by the receiver portion of the participant transmitter-receiver. Consequently, it follows that if the signal combining device provided in the participant transmitter-receiver is a switching circuit for selectively delivering only the best received modulated carrier waves then the outer carrier-frequency power amplifiers in the system will be meaningless although they are operating at the highest efficiency. Inasmuch as a microwave relay system includes, a number of cascaded repeater stations, each having a frequency-diversity transmitter-receiver, the total power loss of the carrier-frequency power amplifiers will be enormous should power be wasted as indicated above, and thus, this type operation should be avoided whenever possible.

In general, a travelling-wave-tube, klystron, or similar microwave power amplifier has a very wide amplification band. Therefore, it is possible to use several different frequency band portions within the overall amplification band of such a power amplifier for frequency-diversity transmission along several transmission paths. For example, if the total band of a travelling-wave-tube power amplifier is 100 mc. and if this 100 mc. band is divided into four frequency band portions each having a common band width of 25 mc., then these bands can be allotted to four transmission paths for quadruple frequency-diversity transmission of an information signal whose band width is 25 mc. It should be noted, however, that inasmuch as the information signal is always amplified simultaneously by means of four frequency band portions of the power amplifier, the output power for each signal transmission path will be only about one fourth the power if the power amplifier were used (not for diversity transmission but) for the ordinary or plain transmission. It follows, therefore, that although the number of wide-band power amplifiers required for diversity transmission can be reduced by using them as indicated above, it should be noted that the decrease in the output power will necessitate a shortening of the distance between neighboring repeater stations. Consequently, the number of repeater stations required will be sharply increased. As a result, it is impossible to reduce the resultant cost required for installing the relay system.

An object of the invention is therefore to provide a frequency-diversity transmitter-receiver system which is less expensive and therefore will reduce the cost required for installing a microwave or other radio relay system.

Another object of the invention is to provide a frequency-diversity transmitter-receiver which reduces the required number of carrier-frequency power amplifiers contained in the transmitter portion to a minimum.

In a frequency-diversity transmitter-receiver of this invention, the carrier-wave power amplifier is so designed that it can amplify the transmission information signal (which has a much narrower frequency band than the amplification band of the amplifier). The amplification band includes all the center frequencies which are preselected to fall within the amplification band of the power amplifier. In other words, this invention is based on the fact that a wide-band amplifier produces the peak output power for an information signal if the amplifier amplifies the information signal alone.

More particularly, describing the invention in conjunction with the simplest dual frequency diversity, the transmitter-receiver of this invention includes a transmitter portion which has a transmitter switch device supplied with an information signal to be transmitted and with a pilot signal which has a very narrow frequency band (when compared with the information signal). The switch is adapted to deliver the information signal to one of its two output terminals and to deliver the pilot signal to the other terminal which are selected by a transmitter control signal to be described hereinafter. A pair of small-power modulators (transmitters) are connected to the two output terminals of the transmitter switch device and are adapted to produce modulated carrier waves having different center frequencies, respectively. These carrier waves are modulated by the respective signals on the two output terminals. A carrier-frequency power amplifier is provided which includes the center frequencies of the information signals within its frequency band. This amplifier should be capable of power-amplifying the outputs of the transmitters. A dual polarization antenna is provided for transmitting the output of the transmitter portion in one of the two transmitting planes of polarization and for receiving a received signal for the receiver portion (to be described hereinafter) in the other or the receiving plane of polarization. The receiver portion includes a first frequency converter for converting the received signal into a first intermediate-frequency signal. A pair of second frequency converters are provided each of which has a local oscillator. These converters are adapted to convert the first intermediate-frequency signal into a pair of second intermediate-frequency signals. A receiver switch device is supplied with the second intermediate-frequency signals from the second frequency converters and is adapted to deliver one of the second intermediate-frequency signals to a pilot signal demodulator which can be selected in compliance with a receiver control signal to be described hereinafter. A comparator circuit is supplied with the outputs of the information signal and the pilot signal demodulators and is adapted to compare the $S/N$ ratios of the demodulated information and the demodulated pilot signals to derive a comparison signal that represents which of the $S/N$ ratios is better. The comparison signal thus represents which of the modulated carrier waves contained in the received signal have been received in better conditions. A control signal generating circuit is provided for producing from the comparison signal a participating transmitter-receiver control signal whose frequency band is lower than the lower limit of the information signal and which supplies this control signal to one of the two output terminals of the transmitter switch device together with the information signal. A transmitter control signal extracting circuit is provided for producing, (in response to a similar participant transmitter-receiver control signal sent from the participant transmitter-receiver and extracted from the demodulated information signal), a transmitter control signal for selecting those carrier waves which have been received by the participant transmitter-receiver in better condition and that should therefore carry the information signal. A receiver control signal deriving circuit is provided for producing in response to the comparison signal a receiver control signal which controls the receiver switch device to select those modulated carrier waves which is recognized by the comparator circuit to have the best $S/N$ ratio and which should consequently be sent to the information signal demodulator. In short, a communication system wherein diversity transmitter-receivers of this invention are employed is designed so that in each of the transmitter-receivers the information and the pilot signals received from the participating transmitter-receiver are compared to derive the participating transmitter-receiver control signal for representing which of the signals has the better $S/N$ ratio (or which of the carrier frequencies for the respective signals will provide the better reception). This control signal is transmitted to the participating transmitter-receiver together with the information and the pilot signals. Thus, the transmitted information signal will be carried by that carrier wave for transmission which will provide the best reception by the participating transmitter-receiver. Thus, the received information signal will be carried by that carrier wave transmitted from the participating transmitter-receiver which is in better condition. Inasmuch as the frequency band of the pilot signal is narrower than that of the information signal and inasmuch as the amplifier contained in the pilot signal demodulator can therefore have a narrow frequency band for amplification and consequently can provide very large amplification, it is possible to obtain (even though the pilot signal component carried by the carrier wave transmitted from the participating transmitter-receiver may be very low in relative level) the pilot signal at a sufficiently high level at the output terminal of the pilot signal demodulator. In other words, this invention makes it possible (although the carrier-frequency power amplifier serves to amplify a resultant signal containing the information and the pilot signals to be transmitted) to make the power amplifier at its peak efficiency for the information signal by virtue of the fact that the pilot signal component is sufficiently smaller than the information signal component. It is thus possible with the invention to provide a transmitter-receiver wherein the carrier-frequency power amplifier is utilized to its full extent.

The above-mentioned and other features and objects of this invention and the means for attaining them will become more apparent and the invention itself will be best understood by reference to the following description of embodiments of the invention taken in conjunction with the accompanying drawings in which:

The single drawing shows in block form an embodiment of the invention.

Referring to the accompanying drawing, a diversity transmitter-receiver of the invention is illustrated therein. The transmitter-receiver includes: a frequency diversity transmitter portion 10T, an antenna portion 10A, and a frequency-diversity receiver portion 10R. The transmitter-receiver comprised of components 10A, 10T and 10R communicates with a transmitter receiver facility comprised of like components 10A', 10T' and 10R' which have been shown in simple "black box" form for the purpose of brevity. The transmitter portion 10T includes an information signal source 11 for producing information signals, such as frequency-division multiplexed telephone signals, to be transmitted. A pilot signal source 12 is provided for producing a pilot signal whose frequency band is appreciably narrower than the information signal. A transmitter switch 13 is supplied from the information and the pilot signal sources 11 and 12 with the information and the pilot signals and is adapted to deliver the information signal to one of two output terminals **13*a* and 13*b* and the pilot signal to the other thereof which are selected in response to the control performed by an accompanying transmitter switch control circuit 13'. Circuit 13' is supplied from the receiver portion 10R with a transmitter control signal to be explained in detail hereinafter. A pair of low-power transmitters 14*a* and 14*b* are connected to the two output terminals 13*a* and 13*b* and are adapted to produce low-power modulated carrier waves having center frequencies $f_1$ and $f_2$, respectively, which carrier waves are modulated by the information and the pilot signals supplied from output terminals 13*a* and 13*b*. A pair of variable attenuators 16*a* and 16*b* are provided for attenuating the respective modulated carrier waves (supplied respectively from the modulators 14***a* and 14*b*) with attenuation ratios determined by an accompanying attenuator control circuit 16'. Circuit 16' is supplied in turn with the transmitter control signal. A wide-band carrier-frequency power amplifier 18 having a bandwidth covering the frequency bands of the modulated carrier waves is connected to the outputs of attenuators 16*a* and 16*b*. The modulators 14*a* and 14*b* are preferably accompanied by carrier-frequency amplifiers, respectively, for amplifying the respective modulated carrier waves.

The antenna portion 10A includes a dual polarization antenna 19 for transmitting and receiving electromagnetic waves having respective planes of polarization spaced by an angle of 90°. A transmitter branching filter 19*t* is interposed between the output terminal of the wide-band power amplifier 18 of the transmitter portion 10T and the antenna 19, for enabling the antenna 19 to transmit the amplified modulated carrier waves on one of the planes of polarization. A receiver branching filter 19*r* is provided for forwarding the received modulated carrier waves captured by the antenna 19 on the other plane of polarization to the receiver portion 10R.

The receiver portion 10R includes: a first frequency converter 22 which is accompanied by a first local oscillator 21 and is adapted to convert the high-frequency signal supplied from the receiver branching filter 19*r* to a first intermediate-frequency converter 22. A pair of second frequency converters 25 and 26 which are accompanied by second local oscillators 23 and 24, respectively, are provided to convert the first intermediate-frequency signal supplied from converter 22, into a pair of second intermediate-frequency signals derived from the received modulated carrier waves which have center frequencies $f_3$ and $f_4$, respectively. A receiver switch 27 supplied with the second intermediate-frequency signals from the second frequency converters 25 and 26 and is adapted to deliver one of the second intermedite-frequency signals to a first one of the two output terminals 27*a* and 27*b* and to deliver the other of the second intermediate-frequency signals to the other of the output terminals. The choice of terminals is selected under control of a receiver switch control circuit 27'. Circuit 27' is supplied in turn with a receiver control signal which will be explained in detail hereinafter. An information signal and a pilot signal demodulator 28 and 29 are connected to the output terminals 27*a* and 27*b*, respectively. An information signal output terminal 31 connected to utilization device 6 is connected to the output side of the information signal demodulator 28. A comparator circuit 32 is provided for comparing the noise levels of the outputs of the demodulators 28 and 29 with each other to deliver a comparison signal which indicates which of the output has lower noise level. A transmitter control signal detector (extractor) 35 which is connected to the information signal demodulator 28 and which comprises a plurality of low-pass filters etc. is provided for delivering the output to be sent to the transmitter switch control circuit 13' and to the variable attenuator control circuit 16'. A signal converter 36 is connected to the output side of the comparator circuit 32 and is adapted to convert the comparison signal supplied from the comparison circuit 32 into a low-frequency signal which has a frequency lower than the lower limit of the frequency band of the information signal. The comparison signal is sent to the output side of the signal source 11 for transmission to the participating transmitter-receiver. It is also sent to the receiver switch control circuit 27' as the receiver control signal (in a manner similar to the transmitter control signal produced by the transmitter control signal extractor 35 for controlling switch 13. Preferably, a first intermediate-frequency amplifier and a second intermediate-frequency amplifier are respectively connected between the first frequency converter 22 and the converters 25 and 26, respectively but have been omitted for purposes of simplicity.

In the above-described transmitter portion 10T, the carrier frequencies $f_1$ and $f_2$ of the modulators (transmitters) 14*a* and 14*b* are so selected that they are within the frequency band of the wide-band carrier-frequency power amplifier 18 and the side-band component of the modulated carrier wave (as modulated by the information signal to be transmitted) of either of the carrier waves of the frequencies $f_1$ and $f_2$ falls outside of the frequency amplification band regardless of the switching operation of the transmitter switch 13. At the receiver portion 10R, the frequency band of the first intermediate-frequency amplifier is selected to sufficiently amplify the first intermediate-frequency signal derived from the received modulated carrier waves of the center frequencies $f_3$ and $f_4$.

The signal converter 36 connected to the output side of the comparator circuit 32 produces in response to the comparison signal (which is derived from the comparator circuit 32 as a result of comparison) a control signal that has the lower frequency band. More particularly, the control signal has a frequency band lower than the lower limit of the frequency band of the information signal to be transmitted, and indicates which of the outputs of the demodulators 28 and 29 has the better signal-to-noise ratio. This control signal is supplied to and modifies the output side of the signal source 11. The signal converter 36 and the comparator circuit 32 may be the circuit disclosed by the applicant in an article appearing at pages 102–108 of 1961 IRE International Convention Record, Part 8, and in particular in FIG. 1 of the article and the related description. The indication of the preferred frequency may be indicated by the control signal as a combination of low-frequency signals, as is the case with the signal in an electronic switchboard. Although the frequency band of the control signal may be above the frequency band of the information signal, the former is preferably selected below the latter in view of economy of the overall frequency band.

The transmitter control signal detector (extractor) 35 connected to the information signal demodulator 28 extracts a control signal, which varies, for example, the biasing voltages of diodes (not shown) contained in the respective variable attenuators 16*a* and 16*b* to vary their attenuation ratios.

The transmitter switch device 13 and 13' and the receiver switch device 27 and 27' are illustrated in the drawing as if they were mechanical switches, however, they may comprise known electronic switches having diodes or switching transistors.

As heretofore described, the transmitter portion 10T of this invention is designed so that both the information signal to be transmitted (having a narrower band width than the wide-band carrier-frequency power amplifier 18) and the pilot signal (having an even narrower frequency band than the information signal) are simultaneously amplified by the wide-band amplifier 18. The information signal is then transmitted on the carrier wave of that frequency ($f_1$ or $f_2$) which is selected in accordance with the control signal sent from the participating transmitter-receiver. This feeds back the information as to which of the frequencies has been received in better condition by the participating transmitter-receiver. The receiver portion 10R is designed so that the noise levels (or the signal-to-noise ratios of the two received modulated carrier waves having the center frequencies $f_3$ and $f_4$) are compared with each other to derive a comparison signal for representing which of the received modulated carrier waves is received in better conditions. The comparison signal is then used to produce a control signal which is sent by the transmitter portion 10T together with the information signal to the participating transmitter-receiver to select that best frequency ($f_3$ or $f_4$) to transmit therefrom the information signal and which is used to select the demodulators so as to enable the information signal to be demodulated from the modulated carrier wave of the preferred frequency.

Although the power level of the pilot signal is much lower than that of the information signal, it is possible to achieve the necessary comparison of the noise levels on the *S/N* ratios because the pilot signal demodulator 29 can have a very narrow frequency band and consequently very high gain.

It will now become apparent that while in a conventional frequency-diversity transmitter-receiver, each of a plurality of carrier waves is modulated by the information signal and the thus modulated carrier waves are transmitted to and received by the participating transmitter-receiver to restore at said participating transmitter receiver the information signal in which the adverse effects of fading have been removed by operating a signal combining device, such as a switching circuit or a combining circuit, in accordance with the noise levels of the modulated carrier waves, in the transmitter-receiver of this invention only one of the carrier waves is modulated by the information signal having a relatively broad frequency band and the other carrier wave is modulated by a pilot signal having a very narrow bandwidth. This invention thus makes it possible to fully utilize the wide-band carrier-frequency power amplifier and the wide-band receiver device.

While the invention has been explained heretofore, with particular reference to the embodiment illustrated in the drawings, these drawings should not restrict the scope of the invention since various modifications thereto are possible. For instance, the receiver portion 10R which has been illustrated as a double superheterodyne receiver device may be a plain and single-stage superheterodyne receiver device. Also, the transmitter portion 10T which has been described to be a dual frequency-diversity transmitter device may easily be modified into a triple or a quadruple frequency-diversity transmitter device by employing additional pilot signals. Furthermore, the transmitter-receiver may be modified into one wherein amplitude modulation is resorted to.

While I have described above the principles of my invention in connection with specific embodiments, it is to be clearly understood that this description is made only by way of example, and not as a limitation to the scope of my invention as set forth in the objects thereof and in the accompanying claim.

I claim:

1. A frequency-diversity transmitter-receiver for use in a radio communication system having at least two transmitter-receivers at each of two remote locations, comprising:

(A) a transmitter portion including:
- (1) an information signal source;
- (2) a pilot signal source for generating pilot signals having a narrower frequency band than the signals generated by said information signal source;
- (3) at least two modulators connected respectively to said sources, each modulator including a carrier wave signal source having different center frequencies, one of said modulators of said carrier signals being generated therein with said information signals and the other one modulating the carrier signals generated therein with said pilot signals;
- (4) first means for generating a first control signal;
- (5) a transmitter switch device for selectively supplying said information and said pilot signals to different ones of said modulators under control of a first control signal applied thereto;
- (6) at least two variable attenuators connected respectively to said modulators for causing, in response to said first control signal, greater attenuation to pilot-modulated modulator output than information - signal - modulated modulator output;
- (7) and a carrier-frequency power amplifier connected in common to said attenuators for amplifying said modulated carrier waves;

(B) an antenna portion supplied from said transmitter portion with said modulated carrier waves for transmitting said modulated carrier waves to at least one of the other transmitter-receivers, said antenna portion also receiving similarly modulated carrier waves of different center frequencies transmitted from another transmitter-receiver;

(C) and a receiver portion including:
- (1) a frequency converter for converting the received modulated carrier waves into at least two intermediate-frequency signals, respectively, one I.F. signal including the received information signal and the other including the received pilot signals,
- (2) an information signal demodulator and a pilot signal demodulator for receiving and demodulating said intermediate-frequency signals supplied thereto into a received information signal and a received pilot signal, respectively,
- (3) second means for generating a second control signal;
- (4) a receiver switch device for selectively supplying said intermediate-frequency signals to said information and said pilot signal demodulators under control of a second control signal applied thereto;
- (5) a comparator circuit connected to receive said received information signals and said received pilot signals for generating a comparison signal indicating which received I.F. signal has the lower noise level;
- (6) said second means comprising a second control signal producing circuit for producing said second control signals in response to said comparison;
- (7) means for supplying said second control signal to control said receiver switch;
- (8) said second means being coupled to the output of said information signal source for producing a transmitter control signal which is added to said information signal transmitted to at least one of the other transmitter-receivers to control the transmitter switch device therein;
- (9) said first means comprising a first control signal extracting circuit for extracting as said first control signal the transmitter control signal from said received information signal;
- (10) means for supplying the thus extracted transmitter control signal as said first control signal to control said transmitter switch device and
- (11) third means for supplying the last-mentioned control signal as said first control signal to said variable attenuators.

References Cited

UNITED STATES PATENTS

| | | | |
|---|---|---|---|
| 2,302,852 | 11/1942 | Goddard | 325—307 |
| 2,572,235 | 10/1951 | Young | 325—158 |
| 2,892,930 | 6/1959 | Magnuski | 325—56 |

OTHER REFERENCES

"Automatic Electric Technical Journal"; vol. 7, No. 5, January 1961, pp. 175–183.

ROBERT L. GRIFFIN, *Primary Examiner.*

JOHN W. CALDWELL, DAVID G. REDINBAUGH, *Examiners.*

B. V. SAFOUREK, *Assistant Examiner.*